(12) United States Patent
Höhener et al.

(10) Patent No.: US 6,660,048 B2
(45) Date of Patent: Dec. 9, 2003

(54) AQUEOUS DYE SOLUTIONS

(75) Inventors: Alfred Höhener, Magden (CH); Roland Frick, Durmenach (FR); Adolf Kaeser, Bottmingen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 59 days.

(21) Appl. No.: 09/836,113

(22) Filed: Apr. 17, 2001

(65) Prior Publication Data

US 2002/0010971 A1 Jan. 31, 2002

Related U.S. Application Data

(63) Continuation-in-part of application No. 08/770,354, filed on Dec. 20, 1996, now abandoned.

(30) Foreign Application Priority Data

Dec. 22, 1995 (CH) ................................. 3670/95

(51) Int. Cl.⁷ ......................... C09B 67/26; C09B 67/14
(52) U.S. Cl. ....................... 8/585; 8/598; 8/681; 8/684; 8/688; 8/919
(58) Field of Search ............................. 8/527, 576, 598, 8/604, 681, 688, 684, 919, 585

(56) References Cited

U.S. PATENT DOCUMENTS

| 4,087,245 A | 5/1978 | Kramer et al. ................. 8/527 |
| 4,273,707 A | 6/1981 | Pedrazzi ..................... 260/187 |
| 4,340,389 A | 7/1982 | Nonn et al. .................... 8/620 |
| 4,654,045 A | 3/1987 | Rowe ............................ 8/527 |
| 4,968,784 A | 11/1990 | Imai et al. ................... 534/797 |

FOREIGN PATENT DOCUMENTS

| GB | 1356121 | 6/1974 |
| GB | 2015018 | 9/1979 |
| GB | 2179361 | 3/1987 |
| GB | 2254335 | 10/1992 |
| JP | 075925 | 10/1988 |

*Primary Examiner*—Margaret Einsmann
(74) *Attorney, Agent, or Firm*—Kevin T. Mansfield

(57) ABSTRACT

The aqueous dye solutions of the composition shown in claim 1 are distinguished by a good storage stability and are suitable for dyeing paper in red color shades.

18 Claims, No Drawings

AQUEOUS DYE SOLUTIONS

This is a continuation-in-part of application Ser. No. 08/770,354, filed on Dec. 20, 1996 now abandoned.

The present invention relates to aqueous dye solutions of red disazo dyes, processes for their preparation and their use for dyeing paper.

The use of concentrated aqueous solutions of dyes has gained importance in recent years, in particular because of the advantages such solutions have over dyes in powder form. By using solutions, the difficulties associated with dust formation are avoided and the users are freed from the time-consuming and often difficult dissolving of the dye powder in water. The use of concentrated solutions has furthermore been stimulated by the development of continuous dyeing processes for paper, since in these processes it is advantageous to introduce the solution directly into the hollander or to add it at any other suitable point in the papermaking.

For some dyes, for example the dyes of the formula (1) defined below, formulation of concentrated dye solutions in free acid form presents difficulties, however, since deposits occur in the concentrated solutions during storage, especially at temperatures below room temperature, and these deposits cannot be dissolved again at all or can be dissolved only with an additional expenditure of work. Furthermore, concentrated solutions which are suitable as a commercial form should give clear solutions comprising about 1 to 3% by weight of dye, without a precipitate, when diluted for preparation of the dyebath, and this should also apply in the widest possible pH range.

Concentrated aqueous dye solutions in free acid form of certain dyes of the formula (1) defined below are known. However these solutions additionally contain considerable amounts of 3-chloro-2-hydroxypropyl trimethylammonium chloride or diethylene glycol monobutyl ether, both of which are undesirable.

The present invention was based on the object of providing suitable concentrated solutions in free acid form for the dyes of the formula (1) defined below which do not contain either a quaternary ammonium halide or a glycol- or diglycol ether. It has now been found that the dye solutions described below meet the requirements imposed in an outstanding manner. The present invention therefore relates to A) concentrated aqueous dye solutions comprising
a) at least 5% by weight, based on the weight of the solution, of a red dye of the formula

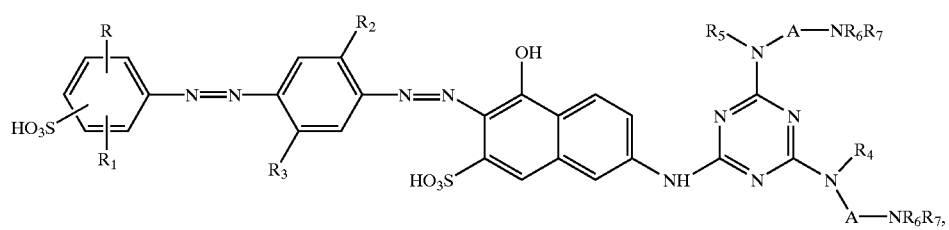

in which

R and $R_1$ independently of one another are each hydrogen, Cl, methyl or methoxy, $R_2$ and $R_3$ independently of one another are each hydrogen, methyl or methoxy, $R_4$ and $R_5$ independently of one another are each hydrogen or $C_1$–$C_4$alkyl, A is an unbranched or branched alkylene radical, which can be interrupted by O, and $R_6$ and $R_7$ independently of one another are each hydrogen or $C_1$–$C_6$alkyl, or in which $R_6$ and $R_7$, together with the N atom bonded to them, form a substituted or unsubstituted 5-, 6-or 7-membered ring, which can contain further heteroatoms, b) formic acid or a $C_1$–$C_4$alkylcarboxylic acid,
c) a solubilizing agent,
d) water and, if appropriate,
e) further additives, or B) concentrated aqueous dye solutions comprising
a) at least 5% by weight, based on the weight of the solution, of a red dye of the formula (1),
b) formic acid or a $C_1$–$C_4$alkylcarboxylic acid,
c) water and, if appropriate,
d) further additives, with the condition that the solutions comprise no solubilizing agent and
less than 0.1% by weight of alkali metal halide, based on the total weight of the solution.

The present invention preferably relates to the dye solutions of group A).

In the dyes of the formula (1), R and $R_1$ are preferably each H, methyl or methoxy, H being particularly preferred.

$R_2$ and $R_3$ are preferably each H.

$R_4$ and $R_5$ are preferably each methyl or, in particular, hydrogen.

Radicals A are, in particular, $C_2$–$C_6$alkylene radicals, in which the alkylene chain is straight or branched or can also be interrupted by bridge members, for example —O—, or in which the alkylene chain is substituted, for example by OH.

A is preferably a radical of the formula —$(CH_2)_n$—, in which n is an integer from 2 to 6.

Particularly suitable radicals A are ethylene, n-propylene, iso-propylene or n-butylene. Among these, n-propylene is especially preferred.

$R_6$ and $R_7$ independently of one another are each linear or branched unsubstituted $C_1$–$C_6$alkyl, or $C_1$–$C_6$alkyl which is substituted, for example by OH or $C_1$–$C_4$alkoxy. The alkyl chains can also be interrupted, for example by —O—.

Preferably, $R_6$ and $R_7$ independently of one another are each unsubstituted $C_1$–$C_4$alkyl, and in an especially preferred embodiment $R_6$ and $R_7$ are identical and are each methyl or ethyl.

A 5-, 6- or 7-membered ring of $R_6$ and $R_7$ together with the N atom joining them is, in particular, a pyrrolidine, piperidine, morpholine or piperazine ring. The piperazine radical can be substituted on the N atom which is not bonded to the alkylene chain, for example by alkyl.

In the dyes of the formula (1), the sulfo group is preferably located in the m- or, in particular, in the p-position relative to the azo group.

Preferred concentrated solutions according to the invention comprise a dye of the formula

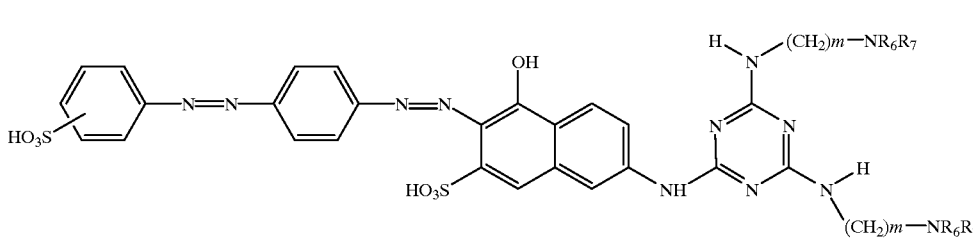

in which
m is 2, 4 or, in particular, 3, and
$R_6$ and $R_7$ are each $C_1$–$C_2$alkyl.

The concentration of the dye can vary within wide limits and is at least 5% by weight, preferably 6 to 15% by weight, in particular 8 to 10% by weight, based on the weight of the concentrated solution.

The alkylcarboxylic acid is, for example, acetic acid, propionic acid, butyric acid or valeric acid. Propionic acid and, in particular, acetic acid are preferred.

Suitable solubilizing agents are, for example, compounds of the following groups:

I) alkali metal or ammonium salts of $C_1$–$C_4$alkylcarboxylic acids,
II) low molecular weight acid amides,
III) low molecular weight lactams or lactones,
IV) alkanolamines or reaction products of ethylene oxide and/or propylene oxide with alkanolamines.

The solubilizing agents of group I) are, in particular, the sodium, potassium, lithium or ammonium salts of acetic acid or propionic acid. Sodium and ammonium acetate are particularly preferred. The solubilizing agents of group I) do not of course have to be employed in the form of the salts mentioned, but can also be prepared in the solutions from the corresponding bases and acids by neutralization.

Low molecular weight acid amides are, in particular, formamide, and especially urea. Suitable solubilizing agents of group III) are, for example, γ-butyrolactam or ε-caprolactone, but in particular γ-butyrolactone, or especially ε-caprolactam.

The solubilizing agents of group IV) are, for example, diethanolamine or triethanolamine, but in particular reaction products of 1 to 6 mol of ethylene oxide and/or propylene oxide with 1 mol of diethanolamine or triethanolamine. Particularly preferred compounds are those of the formula

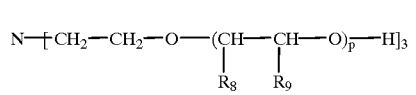

in which
p is an integer from 1 to 6 and of the substituents $R_8$ and $R_9$, one is hydrogen and the other is hydrogen or methyl.

Preferably, in the compounds of the formula (3), p is 1.

The solubilizing agents of group 1) are preferably present in an amount of 1 to 6% by weight, in particular 1 to 3% by weight, based on the weight of the solution.

The solubilizing agents of groups II), III) and IV) are preferably present in an amount of 3 to 20% by weight, in particular 6 to 15% by weight, based on the weight of the solution.

It is also possible to employ mixtures of solubilizing agents of one group or mixtures of solubilizing agents of different groups, for example mixtures of ammonium acetate and urea.

The $C_1$–$C_4$alkylcarboxylic acid is preferably employed in an amount of 3 to 20% by weight, in particular 6 to 15% by weight, based on the weight of the solution.

Further additives which can be present in the concentrated solutions according to the invention are organic solvents, for example dimethylsulfoxide, N-methylpyrrolidone, ethylene glycol, propylene glycol or glycerol, and boric acid.

The concentrated aqueous solutions of group A) according to the invention can be prepared, for example, by filtering the dye solution obtained during preparation of the dye, subsequently adding the $C_1$–$C_4$alkylcarboxylic acid, the solubilizing agent and, if appropriate, further additives, while stirring, and finally adjusting the desired concentration with water.

The concentrated aqueous solutions according to the invention of group B) comprise no solubilizing agents and may therefore comprise only little alkali metal halide, since otherwise highly viscous solutions or those having an inadequate storage stability are obtained. As a result of the synthesis of the dyes of the formula (1) which is usually carried out by reaction of cyanuric chloride with the corresponding amines at an alkaline pH, however, the dye solutions usually comprise considerable amounts of alkali metal halide and must therefore be brought to an alkali metal halide content of less than 0.1% by weight, based on the total weight of the solution, by a suitable process.

This is achieved in a manner known per se, for example by reverse osmosis, ultrafiltration or dialysis. Such desalination processes are known, for example from EP-A0059782. The membranes used in these processes are also known, for example from EP-A0061424.

The process conditions of this desalination are chosen such that dye solutions which comprise less than 0.1% by weight, preferably less than 0.07% by weight, based on the total weight of the solution, of alkali metal halides are obtained.

Alkali metal halide in this Application is to be understood as meaning the fluoride, chloride, bromide or iodide of lithium, sodium or potassium.

The concentrated aqueous solutions according to the invention of group B) can thus be prepared, for example, by filtering and desalinating the dye solution obtained during preparation of the dye, subsequently adding the $C_1$–$C_4$alkylcarboxylic acid and, if appropriate, further additives, while stirring, and finally adjusting the desired concentration with water.

The concentrated aqueous dye solutions according to the invention are stable for several weeks at storage temperatures of between 60° and –20° C. and are suitable for dyeing paper, an which they produce attractive red colour shades of high light-fastness with or without the use of a sizing agent and/or filler.

The dye solutions can be used by all the processes customary for substantive dyes in the paper industry, in particular in pulp and in surface dyeing of paper for sized and nonsized grades, starting from bleached or unbleached cellulose of varying origin, such as softwood or hardwood sulfite and/or sulfate cellulose, mechanical wood pulp or mixtures thereof with cellulose.

The dyes of the formulae (1) and (2) are known, for example from JP-A-075924, or can be obtained analogously to the preparation procedure described therein.

In the following examples, parts are parts by weight and the temperatures are stated in degrees Celsius.

EXAMPLE 1

120 parts of glacial acetic acid are added dropwise to 780 parts of an aqueous solution comprising 96 parts of the dye of the formula

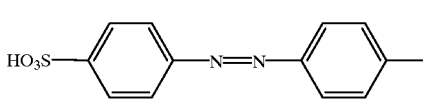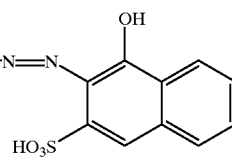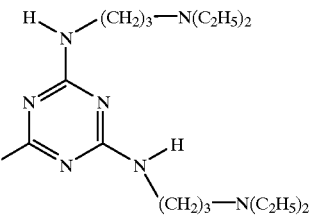

in the course of 50 minutes, while stirring. 120 parts of urea are added to the resulting thinly liquid solution in the course of 10 minutes, while stirring, and the mixture is stirred for a further 20 minutes. After addition of 180 parts of water, the mixture is stirred for a further 30 minutes.

A thinly liquid dye solution which is stable to storage for several months both at room temperature and at 4°, at −20° and at 60° C. is obtained.

This solution can be diluted as desired with water without precipitates occurring. A dyeing liquor which contains 2% of the above dye solution is stable to storage for several days at room temperature.

EXAMPLE 2

120 parts of glacial acetic acid are added dropwise to 780 parts of an aqueous solution comprising 96 parts of the dye from Example 1 in the course of 50 minutes, while stirring. 24 parts of ammonium acetate are added to the resulting thinly liquid solution in the course of 10 minutes, while stirring, and the mixture is stirred for a further 20 minutes. After addition of 276 parts of water, the mixture is stirred for a further 30 minutes.

A thinly liquid dye solution which is stable to storage for several months both at room temperature and at 4°, at −20° and at 60° C. is obtained.

This solution can be diluted with water as desired, without precipitates occurring. A dyeing liquor which contains 2% of the above dye solution is stable to storage for several days at room temperature.

EXAMPLE 3

120 parts of glacial acetic acid are added dropwise to 780 parts of an aqueous solution comprising 96 parts of the dye from Example 1 in the course of 40 minutes, while stirring. 84 parts of the reaction product of 3 mol of propylene oxide with 1 mol of triethanolamine are added to the resulting thinly liquid solution in the course of 10 minutes, while stirring, and the mixture is stirred for a further 20 minutes. After addition of 240 parts of water, the mixture is stirred for a further 30 minutes.

A thinly liquid dye solution which is stable to storage for several months both at room temperature and at 4°, at −20° and at 60° C. is obtained.

This solution can be diluted with water as desired, without precipitates occurring. A dyeing liquor which contains 2% of the above dye solution is stable to storage for several days at room temperature.

EXAMPLE 4

1 part of 48% acetic acid is added dropwise to 2.6 parts of an aqueous solution comprising 0.32 part of the dye from Example 1. 0.1 part of sodium acetate is added to the resulting thinly liquid solution. After addition of 0.3 part of water, the mixture is shaken thoroughly.

A thinly liquid dye solution which is stable to storage for several months both at room temperature and at 4°, at −20° and at 60° C. is obtained.

This solution can be diluted with water as desired without precipitates occurring. A dyeing liquor which contains 2% of the above dye solution is stable to storage for several days at room temperature.

EXAMPLE 5

1 part of 40% propionic acid is added to 2.6 parts of an aqueous solution comprising 0.32 part of the dye from Example 1. 0.3 part of urea is added to the resulting thinly liquid solution. After addition of 0.1 part of water, the mixture is shaken vigorously.

A thinly liquid dye solution which is stable to storage for several months both at room temperature and at 4°, at −20° and at 60° C. is obtained.

This solution can be diluted with water as desired without precipitates occurring. A dyeing liquor which contains 2% of the above dye solution is stable to storage for several days at room temperature.

EXAMPLE 6

2662 parts of an aqueous solution of pH 9.7 comprising 256 parts of the dye described in Example 1, 40 parts of NaCl and 26 parts of diethylaminopropylamine is brought to a pH of 12 by addition of 40% NaOH and then desalinated on a laboratory reverse osmosis unit under the following conditions: MPT 30 (MPS) membrane (polyethyleneimine); about 50° C.; feed 12 l/minute; 25 bar; initial flow rate 1425 l/m²d. After 6 hours, 1234 parts of solution comprising 20.75% of dye and 0.04% of NaCl are obtained. The solution no longer contains diethylaminopropylamine. It is brought to a pH of 3.7 and a dye content of 10% by dropwise addition of glacial acetic acid and addition of water.

A thinly liquid dye solution which is stable to storage for several months both at room temperature and at 4°, at −20° and at 60° C is obtained.

This solution can be diluted with water as desired without precipitates occurring. A dyeing liquor which contains 2% of the above dye solution is stable to storage for several days at room temperature.

EXAMPLE 7

70 parts of chemically bleached sulfite cellulose (from softwood) and 30 parts of chemically bleached sulfite cellulose (from birchwood) are beaten in 2000 parts of water in a hollander. 2.5 parts of the dye solution described in Example 1 are added to this pulp. After a mixing time of 20 minutes, paper is produced from this pulp. The absorbent paper obtained in this manner is red in colour. The dyeing shows a high fastness to light. The waste water is practically colourless.

EXAMPLE 8

3.0 parts of the dye solution from Example 6 are dissolved in 100 parts of water and the solution is added to 100 parts of chemically bleached sulfite cellulose, which have been beaten with 2000 parts of water in a hollander. After thorough mixing for 15 minutes, the pulp is sized with rosin size and aluminium sulfate in the customary manner. Paper produced from this pulp has a red shade with good wet-fastness properties and good fastness to light.

What is claimed is:

1. A concentrated aqueous dye solution consisting essentially of
    a) at least 5% by weight, based on the weight of the solution, of a red dye of the formula

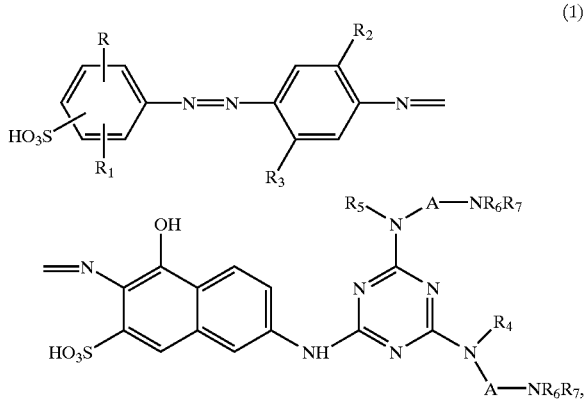

(1)

in free acid form, in which
    R and $R_1$ independently of one another are each hydrogen, chloro, methyl or methoxy,
    $R_2$ and $R_3$ independently of one another are each hydrogen, methyl or methoxy,
    $R_4$ and $R_5$ independently of one another are each hydrogen or $C_1$–$C_4$alkyl, A is an unbranched or branched $C_2$–$C_6$alkylene radical, which can be interrupted by O, and
    $R_6$ and $R_7$ independently of one another are each hydrogen or $C_1$–$C_6$alkyl, or in which
    $R_6$ and $R_7$, together with the N atom bonded to them, form a substituted or unsubstituted 5-, 6- or 7-membered ring, which can contain further O or N heteroatoms,
    b) formic acid or a $C_1$–$C_4$alkylcarboxylic acid,
    c) 3 to 20% by weight of urea, based on the weight of the solution, and
    d) water,
with the proviso that the solution does not contain either a quaternary ammonium halide or a glycol- or diglycol ether.

2. A process for dyeing paper which comprises applying a tinctorially effective amount of a concentrated aqueous dye solution according to claim 1 to said paper, or to a pulp and then converting said pulp to paper.

3. A concentrated aqueous dye solution according to claim 1, in which R and $R_1$ are each H, methyl or methoxy.

4. A concentrated aqueous dye solution according to claim 3, in which R and $R_1$ are each H.

5. A concentrated aqueous dye solution according to claim 1, in which $R_2$ and $R_3$ are each H.

6. A concentrated aqueous dye solution according to claim 1, in which $R_4$ and $R_5$ are each methyl or hydrogen.

7. A concentrated aqueous dye solution according to claim 1, in which A is a radical of the formula —$(CH_2)_n$—, in which n is an integer from 2 to 6.

8. A concentrated aqueous dye solution according to claim 7, in which A is ethylene, n-propylene, iso-propylene or n-butylene.

9. A concentrated aqueous dye solution according to claim 1, in which $R_6$ and $R_7$ independently of one another are each unsubstituted $C_1$- to $C_4$alkyl.

10. A concentrated aqueous dye solution according to claim 9, in which $R_6$ and $R_7$ are identical and are each methyl or ethyl.

11. A concentrated aqueous dye solution according to claim 1, in which the sulfo group is located in the m- or in the p-position relative to the azo group.

12. A concentrated aqueous dye solution according to claim 1, comprising 6 to 20% by weight of dye, based on the weight of the solution.

13. A concentrated aqueous dye solution according to claim 12, comprising 8 to 10% by weight of dye, based on the weight of the solution.

14. A concentrated aqueous dye solution according to claim 1, comprising a dye of the formula

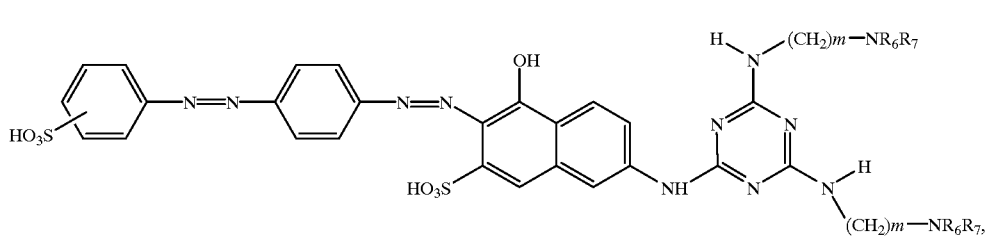

(2)

in which m is 2, 3 or 4, and $R_6$ and $R_7$ are each $C_1$–$C_2$alkyl.

15. A concentrated aqueous dye solution according to claim 1, comprising urea in an amount of 6 to 15% by weight, based on the weight of the solution.

16. A process for the preparation of a concentrated aqueous solution of a dye of the formula (1) according to claim 1, which comprises filtering and, optionally, desalinating the dye suspension obtained during preparation of the dye, subsequently adding the formic or $C_1$–$C_4$alkylcarboxylic acid and the urea while stirring, and finally adjusting to the desired concentration with water.

17. A concentrated aqueous dye solution according to claim 1, comprising a $C_1$–$C_4$alkylcarboxylic acid in an amount of 3 to 20% by weight, based on the weight of the solution.

18. A concentrated aqueous dye solution according to claim 17, comprising a $C_1$–$C_4$alkylcarboxylic acid in an amount of 6 to 15% by weight, based on the weight of the solution.

* * * * *